United States Patent

Gadow et al.

[11] Patent Number: 5,955,038
[45] Date of Patent: Sep. 21, 1999

[54] OZONIZER AND METHOD OF MANUFACTURING IT

[75] Inventors: Rainer Gadow, Aschau am Inn; Gunter Riege, Wiesbaden, both of Germany

[73] Assignee: euroflamm GmbH, Bremen, Germany

[21] Appl. No.: 08/929,918

[22] Filed: Sep. 15, 1997

Related U.S. Application Data

[63] Continuation of application No. PCT/EP96/01121, Mar. 15, 1996.

[30] Foreign Application Priority Data

Mar. 25, 1995 [DE] Germany .................... 195 11 003

[51] Int. Cl.$^6$ ..................................... B01J 19/08
[52] U.S. Cl. ............................. 422/186.07; 422/186.19; 422/186.2
[58] Field of Search ................ 422/186.07, 186.19, 422/186.2

[56] References Cited

U.S. PATENT DOCUMENTS 4,666,679  5/1987  Masuda et al. .................. 422/186.07
4,892,713  1/1990  Newman ........................ 422/186.07

FOREIGN PATENT DOCUMENTS 0202501  11/1986  European Pat. Off. .
0385177  9/1990   European Pat. Off. .

*Primary Examiner*—Kishor Mayckar
*Attorney, Agent, or Firm*—Oppenheimer Wolff & Donnelly LLP

[57] ABSTRACT

Described is a ozonizer with a first metal electrode and a second metal electrode with a discharge gap between them, the first electrode being covered with a dielectric. At least the first electrode is designed as an aluminium or aluminium-alloy coating on a glass substrate. The dielectric consists of a thermally sprayed ceramic film, preferably made of α-aluminium oxide, titanium oxide or hafnium oxide. Also described is a method of manufacturing the ozonizer, the method calling for the ceramic film acting as the dielectric on the first electrode to be applied by thermal spraying. The two electrodes are preferably also produced by thermal spraying. The ozonizer has a particularly high yield, is corrosion-resistant and can be manufactured simply and inexpensively.

32 Claims, 2 Drawing Sheets

5,955,038

OZONIZER AND METHOD OF MANUFACTURING IT

CROSS-REFERENCES TO RELATED APPLICATIONS

This application is a continuation application of International Application PCT/EP96/01121, with an international filing date of Mar. 15, 1996 which claims priority to German Patent Application 195 11 003.1 filed Mar. 25, 1995.

STATEMENT REGARDING FEDERALLY SPONSORED RESEARCH OR DEVELOPMENT

Not applicable.

Reference to a "Microfiche Appendix" (see CFR 1.96)

Not applicable.

BACKGROUND OF THE INVENTION

1. Field of the Invention

The present invention relates to an ozonizer having a first electrode and a second electrode with a discharge gap formed between them, the first electrode being covered with a dielectric.

The invention further relates to a method of manufacturing an ozonizer having two electrodes, with a discharge gap formed between them, and further with a dielectric arranged between the electrodes.

Ozonizers that serve to produce ozone operate according to the principle of silent electric discharge. An ozonizer comprises essentially two oppositely arranged electrodes, separated one from the other by a discharge gap and a dielectric. An oxygen-containing gas, such as air or pure oxygen, is directed through the discharge gap, and ozone is produced by electric discharge in the discharge gap. The electrodes are supplied with voltages of approximately 5 to 20 kV, mostly with an a.c. frequency of 50 to 60 Hz. Higher frequencies, that can be achieved by series connection of a frequency transformer, allow the ozone output to be increased.

The ozone yield of ozonizers, i.e. the ozone quantity produced per unit area, is proportional to the dielectric constant and inversely proportional to the thickness of the dielectric.

The dielectric prevents the silent discharge from changing gradually to a glow discharge or arc discharge condition, which would produce only a fraction of the ozone yield.

2. Description of the Related Art Including Information Disclosed Under 37 CFR 1.97 and 1.98

EP 0 202 501 B1 discloses an ozonizer having an inner metal tube which serves as inner electrode, the metal tube being covered on its outside by a dielectric film made from a titanium oxide ceramic, sealed by a glass passivation layer. The outer electrode is provided by an outer metal tube so that the discharge gap is formed between the dielectric on the inner metal electrode and the outer metal tube.

The metal electrodes of an ozonizer of that type are exposed to heavy chemical attack by the ozone produced. In order to be able to withstand the heavy corrosive attack by the ozone, the titanium dioxide layer, with its covering glass passivation layer, must therefore be made with extraordinary care to prevent any corrosion of the covered metal tube. Further, applying a titanium oxide film and an additional passivation layer is a relatively complex and expensive process.

Another ozonizer of a similar kind has been described by EP 0 172 756 A1.

The known ozonizer comprises an inner ceramic tube, with a metallized inner surface, which is surrounded by an outer meal tube so as to form a discharge gap therebetween. In this case, the dielectric is constituted by the ceramic tube itself.

Given the fact that for technical reasons relating to the manufacturing process a minimum thickness must be observed for the ceramic tube, the ozone yield achieved with such an ozonizer is also relatively low. And in addition, to manufacture ceramic tubes with the required precision is also extraordinarily complicated and expensive.

Another ozonizer of a similar kind has been known from DE 26 18 243 C3; it comprises at least one plate-shaped or cylindrical dielectric, both sides of which are subjected to the action of an air flow, the dielectric being arranged in parallel with or concentrically between a plate-shaped or cylindrical high-voltage electrode and a plate-shaped or cylindrical grounding electrode. The dielectric consists in this case of a ceramic material with a content of 70 to 95% of aluminium oxide, less than 25% of silicon oxide and less than 10% of at least one alkali oxide or alkaline earth oxide, and has a relative dielectric constant of 5 to 10 and a thickness of 0.5 to 1 mm.

The ozone yield being proportional to the dielectric constant and inversely proportional to the thickness of the dielectric, a good ozone yield can be achieved by making the dielectric layer relatively thin and giving it a relatively high dielectric constant.

It is a problem with the known ozonizer to manufacture the plates or tubes from a ceramic material with sufficient precision; this practically can be achieved only by isostatic pressing, followed by a sintering process.

EP 0 385 177 A1 further describes an ozonizer and a method of manufacturing it, where the discharge gap is formed between to concentrically arranged metal tubes, the inner metal tube being covered by an aluminium layer, which in turn is covered by a dielectric layer consisting of several superimposed layers having different dielectric constants, the first layer adjoining the discharge gap having a lower dielectric constant than the next lower second enamel layer.

The known arrangement and the known method are connected with the disadvantage that the process of applying the different enamel layers is complicated and expensive.

BRIEF SUMMARY OF THE INVENTION

Now, it is an object of the present invention to provide an ozonizer and a method for manufacturing it, which render the manufacture simple and inexpensive. It is a further object of the invention to provide an ozonizer and a method for manufacturing it which ensure an improved ozonizer yield and good corrosion-resistance of the ozonizer in long-time service.

These and other objectives are achieved with an ozonizer of the type described above by the fact that the first electrode is designed as a metal layer on a glass or glass-ceramic substrate and that the dielectric is designed as a ceramic layer on the first electrode.

By using glass or glass ceramic as a substrate for the electrode, the invention provides a substrate which can be produced inexpensively and with extremely high manufacturing precision and which at the same time exhibits excellent corrosion-resistance. In addition, the substrate exhibits natural tightness to gas, which is not automatically the case with ceramic tubes manufactured by sintering.

Generally, it has been known in connection with prior art ozonizers to use glass tubes as a dielectric; according to the invention, however, the glass or glass-ceramic material is not used as a dielectric, but merely as a substrate upon which a metal layer is applied as electrode, which latter is then covered by a ceramic layer that serves as dielectric.

The invention thus achieves a considerable increase in energy yield due to the fact that a ceramic material can be used as a dielectric whose dielectric constant is several times higher than that of usual glass, i.e. in the order of a approximately 20 to 30, whereas usual glass types have dielectric constants of approximately 3 to 5.

By using for the electrode and the dielectric a substrate produced with extremely high precision it is possible to design the dielectric as a relatively thin layer, with a film thickness of only a few tenths of a millimeter, while still ensuring a sufficiently high puncture strength.

The energy yield being inversely proportional to the film thickness of the dielectric, the invention thus enables the energy yield to be further increased.

It has been found according to the invention that a layered structure comprising a glass or glass-ceramic substrate, covered by a metal electrode with a ceramic dielectric layer applied thereon, can be manufactured, especially by thermal spraying, to ensure that the ozonizer tubes or plates are sufficiently temperature-resistant and resistant to thermal shocks.

Heretofore, a layered structure of this type, comprising a glass or glass-ceramic substrate, was thought to be impossible as one generally expected excessively high voltages due to differences in the thermal expansion coefficients.

The invention has overcome this prejudice with the result that a considerably improved ozonizer with clearly higher energy yield has been made available.

According to another embodiment of the invention the second electrode is likewise designed as a metal layer on a second glass or glass-ceramic substrate. According to an alternative design the second electrode, which acts as counter-electrode, may also be designed as a solid metal electrode, made preferably from high-grade steel. As the demands placed on the counter-electrode, in terms of dimensional accuracy and corrosion-resistance, are not as critical as those placed on the fist electrode, whose dimensional accuracy has an effect also on the dielectric applied thereon, the use of solid metal electrodes, consisting preferably of high-grade steel, will as a rule be sufficient.

The ozonizer according to the invention may be designed as a tubular ozonizer.

It is, however, understood that the ozonizer may also be designed as a plate-type ozonizer, especially since more recently processes have become available for manufacturing glass plates with extraordinarily high manufacturing precision (known as float glass).

If the ozonizer according to the invention is designed as a plate-type ozonizer, a plurality of discharge gaps may be provided respectively between one electrode and one associated counter-electrode.

Such a sandwiched structure permits the ozonizer to be given a particularly compact design.

In this embodiment, preferably at least one substrate is provided on its two sides with electrodes and dielectrics applied on top of the latter.

This structure, which enables a substrate to be used on both sides, leads to a still further reduction in size and to additional cost savings.

According to a further advantageous development of the invention the electrodes provided on a glass or glass-ceramic substrate are made from aluminium or an aluminium alloy, from titanium or a titanium alloy.

Both aluminium and titanium have high chemical resistance to ozone due to the fact that they form on their surface a thin but extremely effective passivation layer. In addition, especially good adhesion to glass and/or glass ceramic is achieved due to the fact that both aluminium and titanium can be integrated into the glass network as what is known as transition ions.

An aluminium alloy containing up to approximately 50% by weight of silicon is particularly preferred in this connection.

As is known, the addition of silicon to an aluminium alloy has the effect, on the one hand, to lower the melting point, with the resulting simplified processing, and on the other hand to improve the adhesion to the glass surface even further. Admixing silicon to the aluminium-silicon alloy leads to even further improved adhesion since silicon, being a vitrifier, has an even higher affinity to glass. Moreover, the use of silicon as an alloy addition does not change the colour of the aluminium alloy so that a good mirror effect of the glass surface and, thus, a good yield will be achieved during ozone production.

Nickel additions or titanium additions likewise do not change the colour of the aluminium alloy so that according to an alternative embodiment of the invention an aluminium alloy containing nickel or titanium may be used. It is understood that aluminium-based mixed alloys with silicon, titanium and nickel may of course also be used.

In the case of an aluminium alloy, the content of silicon in the alloy should not exceed approximately 50% by weight, since the conductivity of Al—Si alloys drops with hypereutectic compositions.

Accordingly, Al—Si alloys with eutectic or slightly hypoeutectic compositions are especially preferred. Nearly eutectic alloys offer the additional advantage that their melting point is clearly lowered and that, accordingly, processing is rendered particularly inexpensive and simple.

In contrast, there do not exist any restrictions of that type in the case of aluminium alloys with nickel or titanium additions as such additions have an only imperceptible influence on the conductivity.

According to another advantageous embodiment of the invention, the dielectric contains aluminium oxide, titanium oxide or hafnium oxide.

Given the fact that aluminium oxide has a high dielectric constant, can be produced easily and inexpensively and can be applied on the basic electrode easily and in the required film thickness by thermal spraying, aluminium oxide is particularly well suited as a dielectric. Pure α-aluminium oxide is particularly preferred for this application.

Similarly, titanium oxide may also be used as dielectric, having likewise a high dielectric constant.

Alternatively, hafnium oxide may also be used, though it is relatively rare and expensive.

According to a further preferred embodiment of the invention, the substrate or substrates consist(s) of borosilicate glass.

This feature provides the advantage that especially tubes and flat glass can be produced from borosilicate glass with extreme precision and at low cost. This is particularly true for the borosilicate glass available from the Schott company under the tradename Duran.

Alternatively, a glass ceramic may be used as substrate. Glass ceramics of this kind usually are lithium glasses that are subjected to a well-targeted thermal treatment after production in order to achieve an extensive crystallisation effect, with the lithium additions acting as nucleation agent. Glass ceramics of that type distinguish themselves by very high temperature-resistance, up to approximately 800 Celsius, and by high resistance to thermal shocks because their thermal expansion coefficient is near zero. Glass ceramics of that type are supplied, for example, by the Schott company under the trade names Ceran and Cerodur. The use of such glass ceramics is especially preferred when the ozonizer is of the plate type, as such glass ceramics can be produced with sufficiently high precision especially in the form of plates.

The invention is further achieved by a method of manufacturing an ozonizer comprising the steps of:

(a) Applying a metal film as a first electrode on a first glass or glass-ceramic substrate;
(b) applying a ceramic film as dielectric upon the first electrode;
(c) arranging the first electrode and a second electrode at a spacing one from the other so as to form a discharge gap between the dielectric and the second electrode.

As has been mentioned before, the use of glass or glass ceramic as substrate provides particular advantages because glass and glass ceramic can be manufactured in tubular form and in the form of plates with a sufficiently high degree of manufacturing precision and at relatively low cost. Precise geometric dimensions of the substrate also lead to particular advantages regarding the application of the metal electrode and of the dielectric, it being possible to achieve a small film thickness for the dielectric in combination with sufficiently high dielectric strength.

According to preferred further development of the invention, the dielectric is applied by thermal spraying.

Applying the dielectric upon the electrode as a ceramic coating by thermal spraying is a relatively low-cost process by which the desired film thickness can be achieved with relatively high accuracy. And this in turn offers the advantage that a particularly thin dielectric film, which still provides sufficiently high dielectric strength, can be used which in turn improves the energy yield. Further, it is possible in this way to apply pure aluminium oxide or titanium oxide films, which are especially preferred as dielectrics. It is thus possible to do without any enamel layers of the kind normally used in the prior art.

According to a further preferred embodiment of the invention, the electrodes provided on a glass substrate are likewise applied on the substrate by thermal spraying.

This again offers the advantage that the desired film thickness can be produced on the glass substrate or on the glass-ceramic substrate easily, at low cost and with relatively high accuracy.

It is particularly preferred in connection with this method to use an aluminium alloy of nearly eutectic composition as this considerably lowers the melting point. In contrast, titanium or titanium alloys, for example, require considerably higher processing temperatures, which is connected with greater effort and higher cost.

Alternatively, it is however also imaginable to provide the glass substrate with a thin metal coating by a corresponding pre-treatment and to apply the electrode material thereafter by an electroplating process.

When using this procedure, titanium, titanium alloys or other higher-melting metals obviously could also be used provided they are sufficiently corrosion-resistant to ozone.

According to the invention it is preferred, both for the application of the electrode material and for the application of the dielectric, if the underlying material is initially roughened, which may be effected, for example, by sand blasting. It has been found in connection with the invention that such a roughening process can be carried out without any problems also with glass or glass ceramic without any risk of breakage.

It should be noted that the before-mentioned features and those to be explained below can be used not only in the respective combinations indicated, but also in other combinations or in isolation, without leaving the context of the present invention.

BRIEF DESCRIPTION OF THE SEVERAL VIEWS OF THE DRAWING(S)

An exemplified embodiment of the invention is depicted in the appended drawings and will be explained in more detail in the description below. In the drawings.

DETAILED DESCRIPTION OF THE INVENTION

Figure 1:
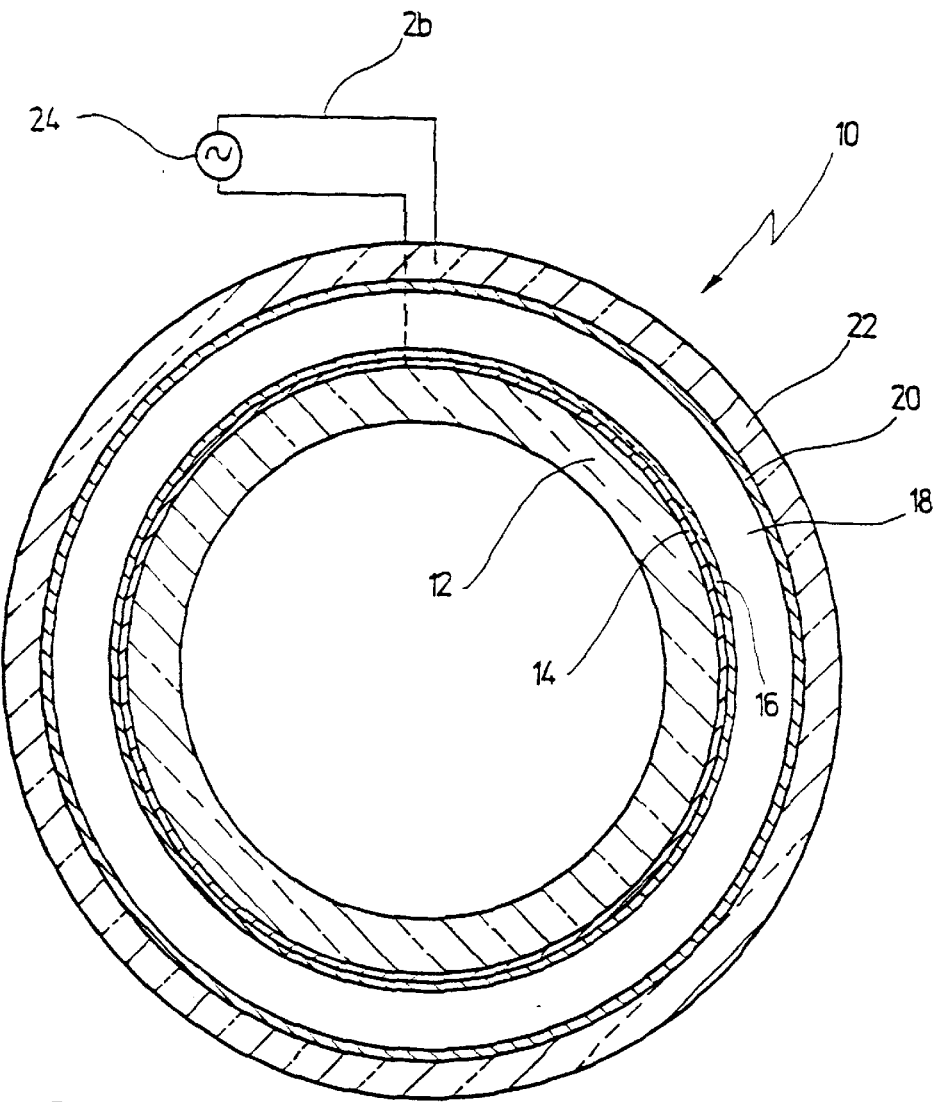
FIG. 1 is a diagrammatic cross-sectional view of a first embodiment of a tube-type ozonizer according to the invention.

In FIG. 1 an ozonizer according to the invention is indicated generally by reference numeral 10. The ozonizer comprises two concentrically arranged glass tubes serving as substrates, namely a first inner substrate 12 and a second outer substrate 22. An outer metallic film serves as dielectric or electrode 14 and has a metallic film thickness of approximately 30 to 70 micrometer has been applied on the outer surface of the first substrate 12 by thermal spraying, preferably by flame-spraying.

The electrode 14 may consist of aluminium with a percentage purity of 99.95% or over, or of an aluminium alloy, preferably an aluminium-silicon alloy of nearly eutectic composition (approximately 11.7% by weight silicon). On the other hand, an aluminium-nickel alloy or an aluminium-titanium alloy may also be used. And mixed alloys are also possible.

On top of the first electrode 14, a further film of aluminium oxide or of titanium oxide is applied as dielectric 16, by thermal spraying, preferably by plasma spraying.

In order to guarantee sufficient puncture strength, the film thickness of the dielectric 16 is greater than the film thickness of the electrode 14 and is in the range of 0.3 to 0.5 mm.

The inner surface of the outer substrate 22 is likewise provided with a coating of pure aluminium or an aluminium alloy as outer electrode 20, this coating being applied by thermal spraying.

Here again, pure aluminium or an aluminium-silicon alloy, preferably of nearly eutectic composition, are preferred.

It is understood that instead of the described arrangement, an outer electrode of high-grade steel may also be used.

Between the dielectric 16 and the second outer electrode 20 a discharge gap 18 is formed through which an oxygen-containing gas is directed for the production of ozone.

It is understood that the representation of FIG. 1 is not true to scale, the thickness of the substrate 12, 22 being each in the range of a few millimeters, while the other films are clearly thinner.

The electrodes 14, 20 are connected to an a.c. voltage source indicated by 24, via lines indicated by reference numeral 26.

The connections are preferably provided on the outer ends of the glass tubes, which besides are held by their ends in a suitable housing (not shown). Further, the substrates 12, 22 are cooled by a cooling liquid in a manner known as such.

The ozonizer is operated, as is generally known, with an a.c. voltage of approximately 5 to 20 kV, at an a.c. frequency of 50 to 60 Hz or a medium frequency.

Figure 2:
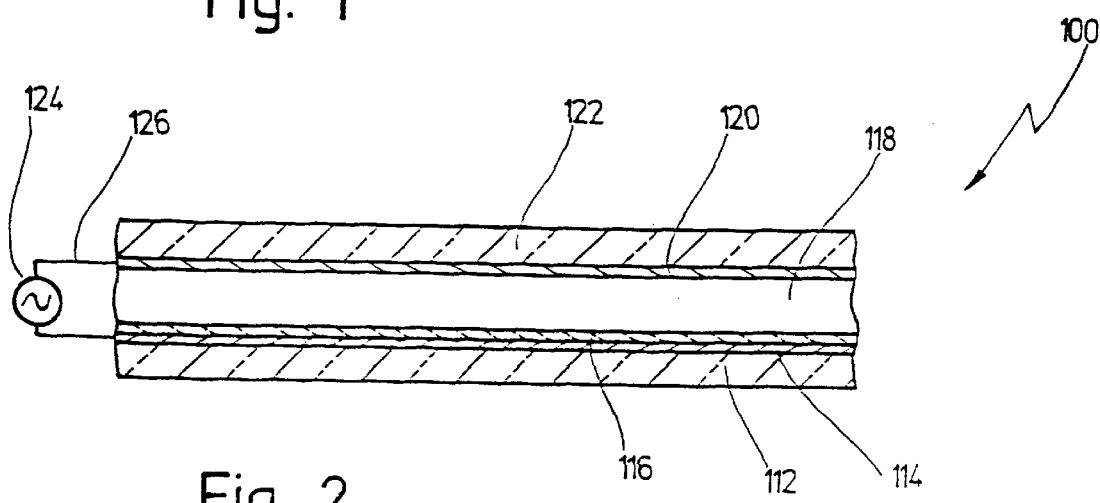
FIG. 2 is a diagrammatic cross-sectional view of a second embodiment of an ozonizer according to the invention, designed as plate-type ozonizer.

FIG. 2 shows a diagram of an alternative embodiment of the invention, indicated generally by reference numeral 100.

The ozonizer 100 comprises two glass plates arranged one parallel to the other and serving as substrates, namely a first substrate 112 and a second substrate 122, with a discharge gap 118 formed between them. The surface of the first substrate 112 is provided, on its side facing the second substrate 122, with a film 118 of aluminium or an aluminium-silicon alloy of, preferably, nearly eutectic composition, which has been applied by thermal spraying and which serves as the first electrode. On top of that first electrode 114, an α-aluminium oxide film has been applied as dielectric 116, preferably by plasma spraying.

The second substrate 122 is provided, on its surface opposite the dielectric 116, with a film of pure aluminium or an aluminium-silicon alloy of nearly eutectic composition, which serves as counter-electrode and has been applied by thermal spraying, preferably by flame-spraying. Here again, the electrodes 114, 120 are connected to an a.c. source 124 via corresponding lines 126.

Figure 3:
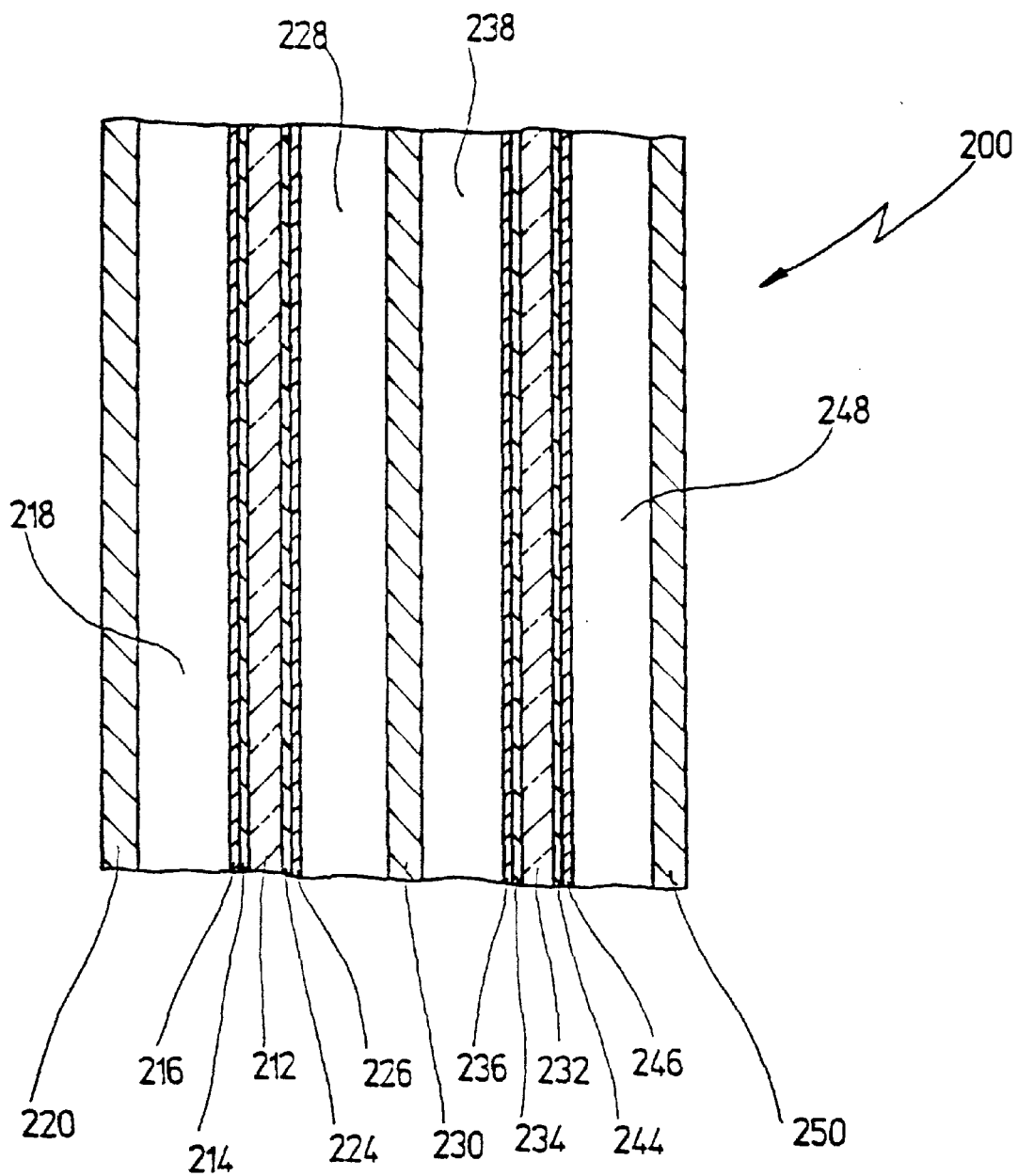
FIG. 3 is a third embodiment of an ozonizer according to the invention, designed as plate-type ozonizer.

Another embodiment of the invention is shown in FIG. 3 and indicated generally by 200.

The ozonizer shown is again a plate-type ozonizer, but contrary to the ozonizer described with reference to FIG. 2 it is a sandwich structure composed of different layers, arranged one beside the other in such a way that different discharge gaps 218, 228, 238, 248 are formed in mutually parallel arrangement.

In order to simply the structure, each glass or glass-ceramic substrate 212 or 232 is coated on both sides with an electrode layer of pure aluminium or an aluminium-silicon alloy 214, 224 or 234, 244, respectively, with a dielectric layer 216, 226 or 236, 246, respectively, being applied on top of each of those layers by thermal spraying.

Between the two substrates 212, 232, there is provided an electrode 230 designed as high-grade steel plate. Similarly, the two outer electrodes 220 and 250 are formed by high-grade steel plates.

All in all, this design results in an especially compact structure of the ozonizer, each of the substrates 212, 232 being used on both of its sides.

It is understood that when ozonizers of higher output are desired, it is of course possible to provide additional discharge gaps by arranging additional ozonizer plates in a sandwich structure together with the combination described above.

What is claimed is:

1. An ozonizer comprising a first electrode and a second electrode forming a discharge gap therebetween, said first electrode being covered with a dielectric, wherein said first electrode comprises a substrate made from one component selected from the group consisting of glass and a glass ceramic, and a metal layer applied directly onto said substrate, said dielectric being applied directly to said metal layer, and wherein said dielectric comprises a ceramic layer applied to said first electrode.

2. The ozonizer of claim 1, wherein said second electrode comprises a second substrate made from one component selected from the group consisting of glass and a glass ceramic, and a second metal layer applied onto said second substrate.

3. The ozonizer of claim 2, wherein said second metal layer comprises at least one component of the group comprising aluminum, an aluminum alloy, titanium and a titanium alloy.

4. The ozonizer of claim 3, wherein said aluminum alloy contains up to approximately 15% by weight of silicon.

5. The ozonizer of claim 3, wherein said aluminum alloy contains nickel.

6. The ozonizer of claim 3, wherein said aluminum alloy contains titanium.

7. The ozonizer of claim 2, wherein said second substrate consists of a borosilicate glass.

8. The ozonizer of claim 2, wherein said second substrate consists of a glass ceramic.

9. The ozonizer of claim 2, wherein said second metal layer is made from a nearly eutectic aluminum alloy comprising at least one component selected from the group consisting silicon, nickel, and titanium.

10. The ozonizer of claim 1, wherein the second electrode is designed as solid metal electrode.

11. The ozonizer of claim 1, being designed as tube ozonizer.

12. The ozonizer of claim 1, wherein the ozonizer is designed as plate ozonizer, comprising a plurality of discharge gaps respectively provided between an electrode and an associated counter-electrode.

13. The ozonizer of claim 12, wherein at least one of said substrates carries on both of its sides electrodes and dielectrics on top thereof.

14. The ozonizer of claim 1, wherein said metal layer comprises at least one component selected from the group consisting aluminum, an aluminum alloy, titanium and a titanium alloy.

15. The ozonizer of claim 14, wherein said aluminum alloy contains up to approximately 15% by weight of silicon.

16. The ozonizer of claim 14, wherein said aluminum alloy contains nickel.

17. The ozonizer of claim 14, wherein said aluminum alloy contains titanium.

18. The ozonizer of claim 1, wherein said ceramic layer comprises aluminum oxide.

19. The ozonizer of claim 1, wherein said ceramic layer comprises titanium oxide.

20. The ozonizer of claim 1, wherein said ceramic layer comprises hafnium oxide.

21. The ozonizer of claim 1, wherein said substrate consists of a borosilicate glass.

22. The ozonizer of claim 1, wherein said substrate consists of a glass ceramic.

23. The ozonizer of claim 1, wherein said metal layer is made from a nearly eutectic aluminum alloy comprising at least one component selected from the group consisting silicon, nickel, and titanium.

24. A method of manufacturing an ozonizer comprising the steps of:

(a) applying a metal film directly onto a first substrate made from one component selected from the group consisting glass and a glass-ceramic to form a first electrode;

(b) applying a ceramic film directly onto said metal film on said first electrode to form a dielectric;

(c) arranging said first electrode and a second electrode at a spacing one from the other to form a discharge gap between said dielectric and said second electrode.

25. The method of claim 24, wherein said ceramic film is applied by thermal spraying.

26. The method of claim 24, wherein said metal film is applied onto said first substrate by thermal spraying.

27. The method of claim 24, wherein said first substrate is metallized firstly, and thereafter said metal film is applied thereon by an electroplating process.

28. The method of claim 24, wherein said first substrate is roughened prior to the application of the metal film.

29. The method of claim 24, wherein said metal film comprises an aluminum alloy containing up to approximately 15% by weight of silicon.

30. The method of claim 24, wherein said ceramic film comprises aluminum oxide.

31. The method of claim 24, wherein said ceramic film comprises titanium oxide.

32. The method of claim 24, wherein said ceramic film comprises hafnium oxide.

\* \* \* \* \*